July 28, 1953 — O. C. GEORGE — 2,646,640
HANDLE FOR FISHING RODS
Filed April 16, 1948 — 2 Sheets-Sheet 1
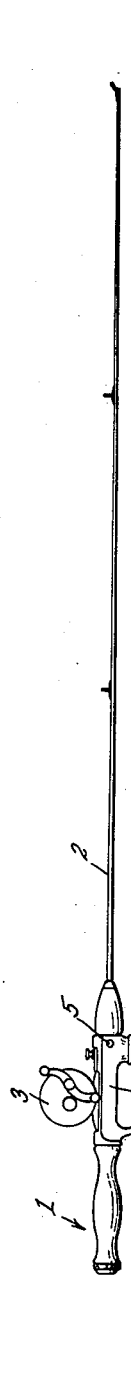
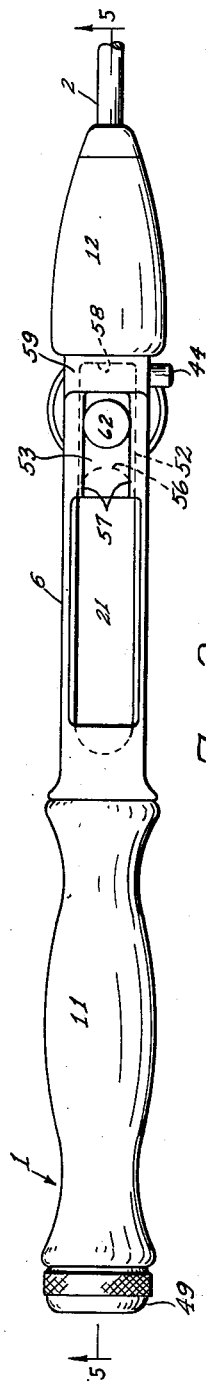
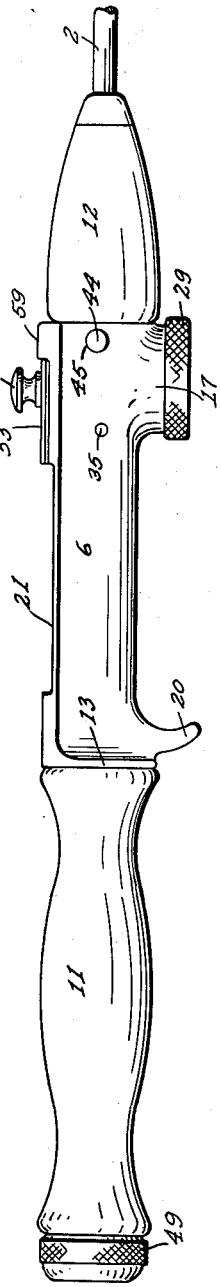
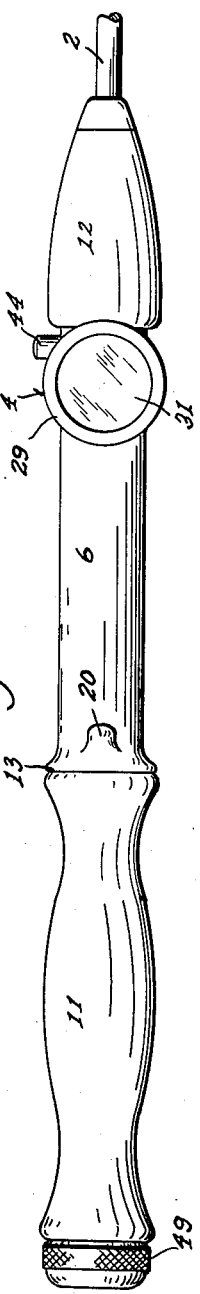
INVENTOR.
OSCAR C. GEORGE
BY
Charles S. Penfold
ATTORNEY July 28, 1953  O. C. GEORGE  2,646,640
HANDLE FOR FISHING RODS
Filed April 16, 1948  2 Sheets-Sheet 2
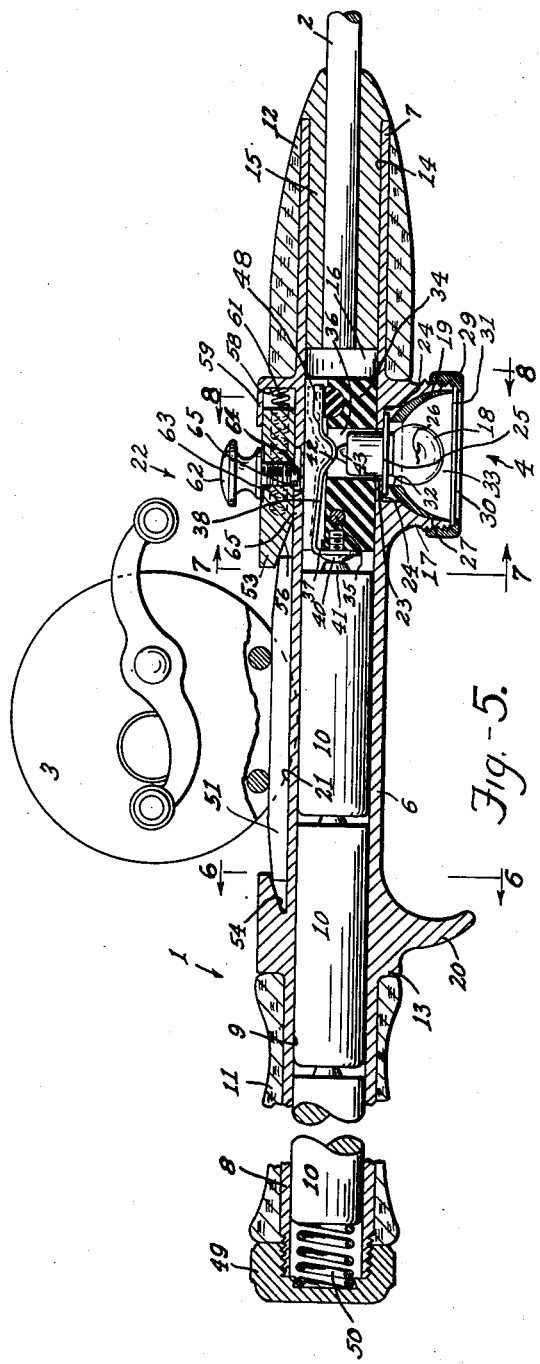
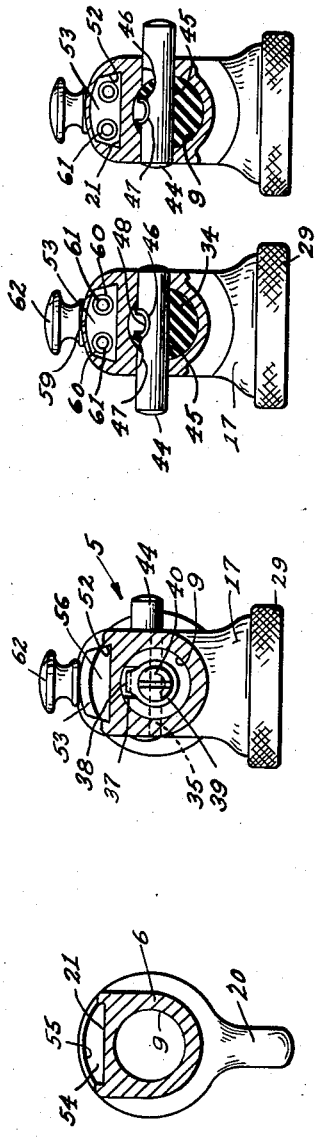
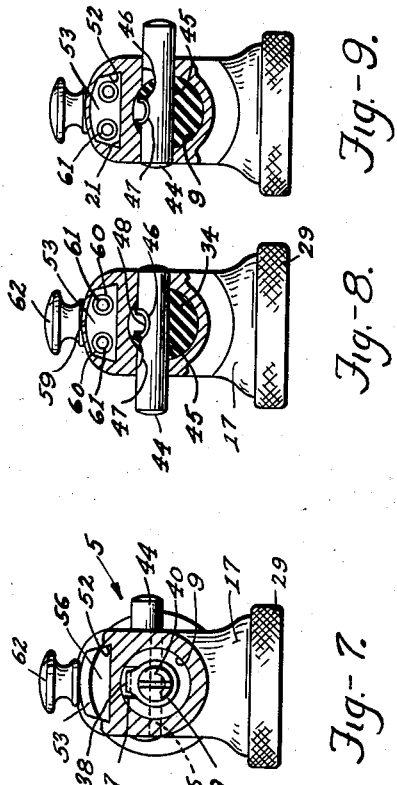
INVENTOR.
OSCAR C. GEORGE
BY
Charles S. Penfold
ATTORNEY Patented July 28, 1953

2,646,640

UNITED STATES PATENT OFFICE 2,646,640

HANDLE FOR FISHING RODS

Oscar C. George, Bronson, Mich.

Application April 16, 1948, Serial No. 21,390

9 Claims. (Cl. 43—17.5)

This invention relates generally to fishing tackle and more particularly is directed to improved principles of design and construction embodied in a fishing rod or pole.

Most fishing is carried on during the daytime but there are many ardent fishermen who are enthusiastic about the thrills and adventures of night fishing. For those who enjoy the sport of fishing at night with a pole, some form of artificial light is desirable to assist in arranging tackle and particularly when one has made a catch and is in the act of landing the fish. Lamps for this purpose are usually mounted in a fixed position or an ordinary flash light is used. These lamps or lights have proven unsatisfactory because it is practically impossible to properly maneuver a separate lamp under all conditions, particularly after a catch is made, as two hands are required to manipulate the rod and reel.

Accordingly, one of the principal objects of the subject invention is to design and construct the handle of the rod so that it constitutes a flash light whereby a beam or rays of light may be readily directed at the location or spot most desired at the appropriate time as the rod is manipulated. More specifically in this respect, an object is to provide a lamp for this purpose in which the light beam is prefocused in a direction laterally from the underside of the handle.

A particular object of the invention is to design and construct the handle so that it provides a fluid or liquid tight chamber or housing for a battery or batteries and other parts of the flash light.

Another object of the invention is to locate the switch on the handle for convenient operation.

Another object of the invention is to provide the handle with improved means for detachably connecting a reel thereto.

An additional object of the invention is to provide a handle assembly which is compact, well balanced, relatively light in weight, non-corrosive, and attractive in appearance.

Additional attributes of the invention reside in its simplicity of design and construction, durability, economy of manufacture and assembly.

Other advantages of the invention will become apparent after the description hereinafter set forth is considered in conjunction with the drawings annexed hereto.

In the drawings wherein like or corresponding parts or elements are identified by the same numeral:

Figure 1 is a side view of a fishing rod with a handle embodying the invention;

Figure 2 is an enlarged top view of the handle assembly illustrated in Figure 1;

Figure 3 is a side view of the assembly exemplified in Figure 2;

Figure 4 is a bottom view of the assembly;

Figure 5 is a longitudinal sectional view taken substantially on line 5—5 of Figure 2;

Figure 6 is a transverse section taken substantially on line 6—6 of Figure 5;

Figure 7 is a transverse section taken substantially on line 7—7 of Figure 5 illustrating structural details;

Figure 8 is a transverse section taken substantially on line 8—8 of Figure 5 showing the switch in an operative position; and Figure 9 is a transverse section similar to Figure 8 showing the switch in an inoperative position.

As exemplified in the drawings, number 1 designates a handle of a fish pole or rod 2, 3 a reel detachably carried by the handle, 4 a lamp, and 5 a switch mechanism for controlling the illumination of the lamp.

The handle may be designed and constructed in various desirable ways, but preferably includes a central or intermediate body section 6, a cylindrical forward extremity 7, and a rear cylindrical extremity 8 somewhat longer than the forward extremity and the central section, but of the same cross-sectional dimension as the forward extremity. The handle may be made from any suitable material, such as die cast aluminum and provided with a cylindrical chamber or bore 9 extending throughout its full length, which chamber, among other things, houses a plurality of batteries 10 and part of the switch mechanism 5. The cylindrical extremities are preferably covered by suitable conventional cork grips 11 and 12 secured in place by any means such as glue. It will be noted that the central section includes an enlarged circular portion 13 which, among other things, provides an abutment for an end of the grip 11.

The forward extremity of the handle provides a socket 14 for the reception of a bushing 15 for detachably securing the butt end of the rod 2 in coaxial relationship with the handle. Obviously, bushings of various sizes or a universal bushing may be employed so that the socket will accommodate rods, the butt ends of which vary in cross sectional dimensions.

The handle adjacent the junction between the central body section and the forward extremity may be provided with a separate partition 16 as shown, or an integral transverse wall for the purpose of sealing off one end of the cylindrical chamber to prevent entry of water or foreign matter into the switch mechanism and other internal parts of the assembly. This factor is important as any water, particularly salt water, will cause serious damage to the working parts and swelling of a battery or batteries adapted to be disposed in the chamber.

The central section 6, which supports the reel, is preferably made generally square or rectangular in cross-section. Its bottom or under side, adjacent the forward end, is preferably provided with an enlargement or laterally extending hollow offset, to constitute a socket 17 for an electric lamp bulb 18 and reflector 19. The rear end of the under side is provided with a curved finger catch or stop 20 spaced longitudinally from and projecting in the same general transverse direction as the offset lamp socket. The under side of the body is preferably curved or rounded as illustrated so as to facilitate gripping the handle. The upper side of the body section is preferably provided with a longitudinal channel or recess 21 and fastening means 22 for detachably connecting the reel to the handle and will be described more in detail subsequently.

Referring again to the lamp socket, the details of which are clearly illustrated in Figure 5 of the drawing, the socket is preferably provided with a round opening 23 for the cylindrical base portion of the lamp. This opening communicates with the interior of the cylindrical chamber and is arranged substantially transverse to the longitudinal axis of the handle. The opening is counter-recessed to form an annular seat 24 for a radial flange or lateral positioning means 25 on the lamp base so as to positively locate the position of the filament 26 in the lamp. The interior of the socket is further provided with a concave bearing surface 27 which is engaged by a reflector 19, which although of metal, may be made of other material suitable for the purpose. The extremity of the socket is annular and exteriorly threaded to support an internally threaded cap 29, having an aperture 30 in its end wall. A lens 31 within the cap is adapted to be forced by the cap into engagement with the annular extremity of the socket including the reflector 19 so that the latter bears against the radial flange 25 on the lamp, to hold such parts firmly assembled. If found desirable, the radial flange may be arranged to engage the inner face of the reflector to predetermine the position of the lamp filament with respect to the reflecting surface of the reflector. The lens 31 is preferably transparent and made from a pyroxylin plastic so that it may also serve as a resilient washer or gasket to seal off and exclude the entry of water or foreign matter into the lamp socket assembly and interior of the chamber. It also has the advantage of being non-breakable. The fact that the reflector engages the bearing surface 27 and the radial lamp flange the seat 23 also assists in sealing off the interior of the chamber from the atmosphere. The reflector is provided with an opening 32 of a size to permit the glass envelope of the lamp to pass therethrough and its inner reflecting surface 33 is preferably of a parabolic curvature so as to focus the beam of light in a predetermined direction conducive to use under all conditions associated with fishing. The parts constituting the lamp and socket sub-assembly may, of course, be designed and constructed in various ways. For example, the lamp socket assembly could be constructed and arranged for adjustment to cast the beam at any desired angle with respect to the handle.

An elongated carrier 34 of insulating material is preferably pressed into the cylindrical chamber 9 to a location against the partition 16 and opposite the lamp socket and is secured in place by a cross pin 35 extending through the carrier and holes provided therefor in the handle. The carrier is provided with a transverse circular clearance opening 36 coaxial with and of the same diameter as opening 23 so as to accommodate the cylindrical base of the lamp. The carrier is also provided with a longitudinal groove 37 which intersects the opening or socket 36, and provides clearance space for the operation of an elongated yieldable bridge member 38 constituting a part of the switch mechanism.

The inner end of the bridge member is bent laterally to form a tab 39 bearing against the inner end of the carrier, and a screw 40 passes through a hole in the tab and into the carrier for securing the bridge and carrier together. The head of the screw serves as a stationary terminal contact to engage a contact 41 on the foremost battery. The remainder of the bridge is freely yieldable and includes an intermediate rounded offset contact portion 42 which is adapted for movement into and out of engagement with the end contact 43 on the lamp by means of a cylindrical actuating rod 44 of insulating material for controlling illumination of the lamp.

The actuating rod is mounted for reciprocal movement in a direction transverse to the longitudinal axis of the handle through a round hole 45 provided therefor in the carrier and suitable aligned holes in the handle. This rod in addition to the pin 35 assists in holding the carrier 34 in place in chamber 9. The rod is of a length sufficient to locate at least one of its ends exteriorly of the handle adjacent its forward extremity for convenient manual operation. An intermediate portion of the actuating rod is formed with a pair of spaced but closely associated generally concave notches or interruptions 46 and 47 which respectively receive the free end 48 of the yieldable bridge member. The free end is preferably curved to form a convex surface so as to nest in each of the notches and at the same time permit easy operation of the bridge and without subjecting the same to distortion.

An end cap 49 threadedly engages the cylindrical rear extremity of the handle and carries a conventional helical spring 50 for maintaining the batteries in intimate electrical contact with one another and in circuit with the stationary contact 40, the metal handle, and the radial lamp flange 25, the latter including the lamp base constituting conventional contact means insulated from its end contact 43.

When the actuating rod 44 is reciprocated in one direction, the free end 48 of the bridge 38 will be caused to nest in the notch 46 as exemplified in Figures 5 and 8, in which position the contact portion 42 on the bridge will engage the end contact 43 on the lamp bulb to illuminate the lamp. When the rod is properly reciprocated in an opposite direction, the free end of the bridge will enter the notch 47, which is of a depth somewhat less than the notch 46 to displace the bridge, so that the contact thereof will disengage the lamp contact, as illustrated by the dotted lines in Figure 5 to open the circuit. Since the bridge is formed so that the contact thereof is normally urged toward the lamp contact, the rod is automatically held in either of its actuating positions by the inherent resilience of the bridge when seated in either notch. Due to the fact that the contact portion 42 of the bridge is normally positioned within the opening 36 in the carrier 34, the bridge is in some measure maintained in a central position within the longitudinal recess 37 in the carrier.

The fastening means employed to facilitate the attachment of a conventional reel to the handle will now be described. The longitudinal channel 21, above referred to, is generally rectangular in shape and extends substantially the full length of the central body section 6 of the handle. The rear part of the channel is utilized to receive the generally rectangular mounting plate 51 of the reel and its forward part provides a guideway 52 for a slidable locking member 53 whereby to detachably connect the reel to the handle.

The rear part of the channel within which the mounting plate is adapted to be disposed is preferably of a depth to conceal the longitudinal edges of the plate and the bottom wall of the channel is made substantially planar so as to provide a firm bearing seat, all of which assists to prevent lateral displacement of the reel.

The upper side of the body section is preferably rounded adjacent the inner end of the channel and is provided with a pocket 54 which in effect constitutes a continuation of the channel. This pocket receives one end of the mounting plate. The inner upper wall of this pocket constitutes a cam surface 55 whereby to assist in wedging the tapered end of the plate snugly in place. The other end of the plate is adapted for disposition in an undercut cam-like recess 56, similar to the pocket, provided in the rear end of the locking member 53.

The body section is also formed with a pair of corresponding parallel flanges 57 which extend upwardly and inwardly to overlie the planar bottom wall of the channel to provide a dovetail fit between the locking member and guideway 52, the cross-sectional shape of the member and guide-way being substantially the same in order that such member is restricted to a reciprocating movement.

A wall 58 constitutes one end of the guideway 52 and such end is preferably covered by an arched bridge portion 59 of the body. A pair of parallel round holes 60 extend inwardly at one end of the locking member and a pair of elongated helical springs 61 are disposed in the holes with their outer free extremities normally engaging the end wall 58 of the guideway to normally maintain the member in a predetermined position so that it is necessary to move the member longitudinally and forwardly of the handle to overcome the resilience of the springs before the mounting plate 51 of the reel can be released from its channel seat. The arched bridge portion 59, among other things, serves to protect and conceal portions of the springs 61 from view. It will be noted that the locking member is of a length somewhat less than the length of its guideway, and that the outer surface of the member is convex and more or less converges into the curved exterior surfaces of the inturned flanges 57 to present a pleasing appearance. All other exterior surfaces of the complete assembly are also fashioned to obtain a harmonious and well-balanced attractive unit.

The locking member is preferably secured in place for longitudinal movement by means of a thumb screw 62, the shank of which extends transversely through a hole 63 provided therefor in the member 53 with its inner pin end 64 disposed in a central longitudinal slot 65 formed in the planar base wall of the guideway. When the inner pin end of the screw is in the slot, the latter limits the extent to which the locking member can be reciprocated in either direction. The locking member and springs associated therewith may be easily removed from the handle by merely disconnecting the screw from such member.

In view of the foregoing description, it will be manifest that improved principles of design and construction have been embodied in a handle of a fishing rod or pole, including provision whereby a beam of light may be directed outwardly, preferably from the underside of the handle for illuminating an area opposite said side. With this improvement, the pole may be readily manipulated to cast the beam to illuminate any area desired, within practical limits, the lamp being preferably so arranged that the beam will be directed to illuminate the appropriate spot so that one may clearly see what maneuvers may be necessary when a caught fish is being hauled in and landed. The device is well balanced and easily handled and by a mere simple wrist action movement, the beam may be played into the boat from which one may be fishing to examine fishing tackle and paraphernalia.

It will also be evident that novel switching mechanism is provided for controlling the circuit to illuminate the lamp, including an improved liquid tight lamp socket assembly. Moreover, that unique means are employed for detachably connecting a reel to the handle.

While I have disclosed the invention with great particularity, and in the best form in which I have embodied it thus far, it will be readily understood that various changes in the arrangement, construction and combination of parts, as well as substitution of equivalents and substitution of materials may be made in the device without departing from the spirit of the invention as more definitely determined by the appended claims.

I claim:

1. A handle for a fishing rod comprising a tubular body provided with a socket at its forward extremity for detachably receiving a rod, a rear extremity, and an intermediate portion, said rear extremity and said intermediate portion forming a casing for a battery, a cap carried by said rear extremity for retaining a battery in said body, a reel seat provided adjacent the upper side of said intermediate portion, means adjacent the extremities of the reel seat for holding a reel mounting plate on the seat, a lamp and reflector disposed in the under side of said intermediate portion, means for connecting a battery in circuit with the lamp, and a switch disposed adjacent the forward extremity and interposed in the circuit for controlling the operation of the lamp.

2. A flashlight comprising a tubular handle providing a casing for a battery, a seating zone for the mounting plate of a reel provided at one portion of the handle, a socket at the forward end of the handle for receiving a fishing rod, said handle being provided with an enlargement between the socket and reel plate seating zone, said enlargement having a portion providing a housing for a lamp, means on the handle located adjacent said one portion and opposite said housing for engaging one end of a reel mounting plate, means on the handle for engaging an opposite end of a reel mounting plate, and switch means for the lamp located at one end of the socket and between the reel plate engaging means and the lamp housing for controlling the operation of the lamp.

3. A flashlight comprising a handle having a cylindrical opening of substantially uniform diameter extending throughout substantially the full length of the handle for receiving a battery, a seat for the mounting plate of a reel provided along the upper side of the handle, a socket at the forward end of the handle for receiving a fishing rod, said handle being provided with an enlargement between the socket and reel seat, said enlargement having means at its lower side providing a support for a lamp, means located adjacent the upper side of said handle and opposite said support for engaging a portion of a reel mounting plate, means on the handle for engaging another portion of a reel mounting plate, and switch means carried by the handle for controlling the operation of the lamp.

4. A flashlight comprising a tubular handle providing a casing for a battery, a seat for the mounting plate of a reel provided on the handle, a socket provided at the forward end of the handle for receiving a fishing rod, said handle being provided with an offset disposed adjacent the base of the socket, said offset being formed to provide a housing for a lamp, means on said handle opposite said housing for engaging a portion of a reel mounting plate, means on said handle for engaging another portion of a reel mounting plate, switch means arranged in the handle, and means for actuating the switch for controlling the operation of the lamp.

5. A flashlight comprising a tubular handle providing a casing for a battery, an elongated seat for the mounting plate of a reel provided on the handle, a fitting at the forward end of the handle for connection with a fishing rod, said handle being provided with an offset disposed adjacent the fitting and the outer extremity of the reel seat, said offset forming an enclosure for a lamp, and said handle having means for engaging one end of a reel mounting plate, switch means for a lamp arranged in the casing between the fitting and reel plate engaging means, and manually operable means for actuating the switch means.

6. A flashlight comprising a tubular body providing a casing for a battery, a handle at the inner end of the body, a socket at the forward end of the body for receiving a fishing rod, said body having an elongated intervening portion disposed between the handle and socket, a seat for the mounting plate of a reel provided along the upper side of the intervening portion, the outer extremity of said intervening portion located adjacent to the socket being provided with an integral housing, means adjacent the inner extremity of the intervening portion and its said outer extremity for engaging the ends of a reel mounting plate, the lower side of the housing providing an enclosure for a lamp, and switch means for a lamp arranged in the body and having a part exposed for manipulation.

7. A fishing rod handle comprising a tubular housing, said housing being open at one end to receive batteries therein, a switch support and lamp base socket within the tubular housing, said housing having an opening in a wall thereof for insertion of a lamp base into said socket, a finger grip and a first reel plate engaging part on said housing, a bulb receiving part and a second part for engaging a reel plate carried by said housing and spaced from said first named part, and a switch within the housing and located between the bulb receiving part and said second reel plate engaging part.

8. A fishing pole handle having a forward portion, a rear handle gripping portion and an intermediate portion, said intermediate portion being tubular and providing a casing for a battery, means carried by the intermediate portion for holding a reel mounting plate against the upper side of the intermediate portion, a rigid offset provided at the underside of the intermediate portion and forming an enclosure for a lamp bulb, a switch located in the intermediate portion opposite the offset, and an actuator for the switch.

9. A flashlight comprising a tubular body provided with a forward extremity providing a support for a fishing rod, said body also including a rear extremity constituting a handle and a portion between the forward extremity and the handle, said handle and said portion forming a casing for a battery, a cap carried by said handle for retaining a battery in said casing, a reel seat provided adjacent the upper side of the portion, means adjacent the reel seat for holding the mounting plate of a reel on the seat, the underside of said portion being provided with an offset rigid with said portion and forming an enclosure for a lamp bulb, a switch carried by the portion at a location opposite said enclosure, and means for connecting the switch in a circuit with the lamp bulb and the battery.

OSCAR C. GEORGE.

References Cited in the file of this patent

UNITED STATES PATENTS

| Number | Name | Date |
| --- | --- | --- |
| 1,836,034 | Luchansky | Dec. 15, 1931 |
| 2,012,894 | Shoemaker | Aug. 27, 1935 |
| 2,289,216 | Seidel | July 7, 1942 |
| 2,379,578 | Heddon | July 3, 1945 |
| 2,409,988 | Schwebs | Oct. 22, 1946 |
| 2,565,633 | Scott | Aug. 28, 1951 |